A. S. HALLIDIE.
GRIPING ATTACHMENT FOR ROPE WAYS.
No. 7,607. Reissued April 17, 1877.
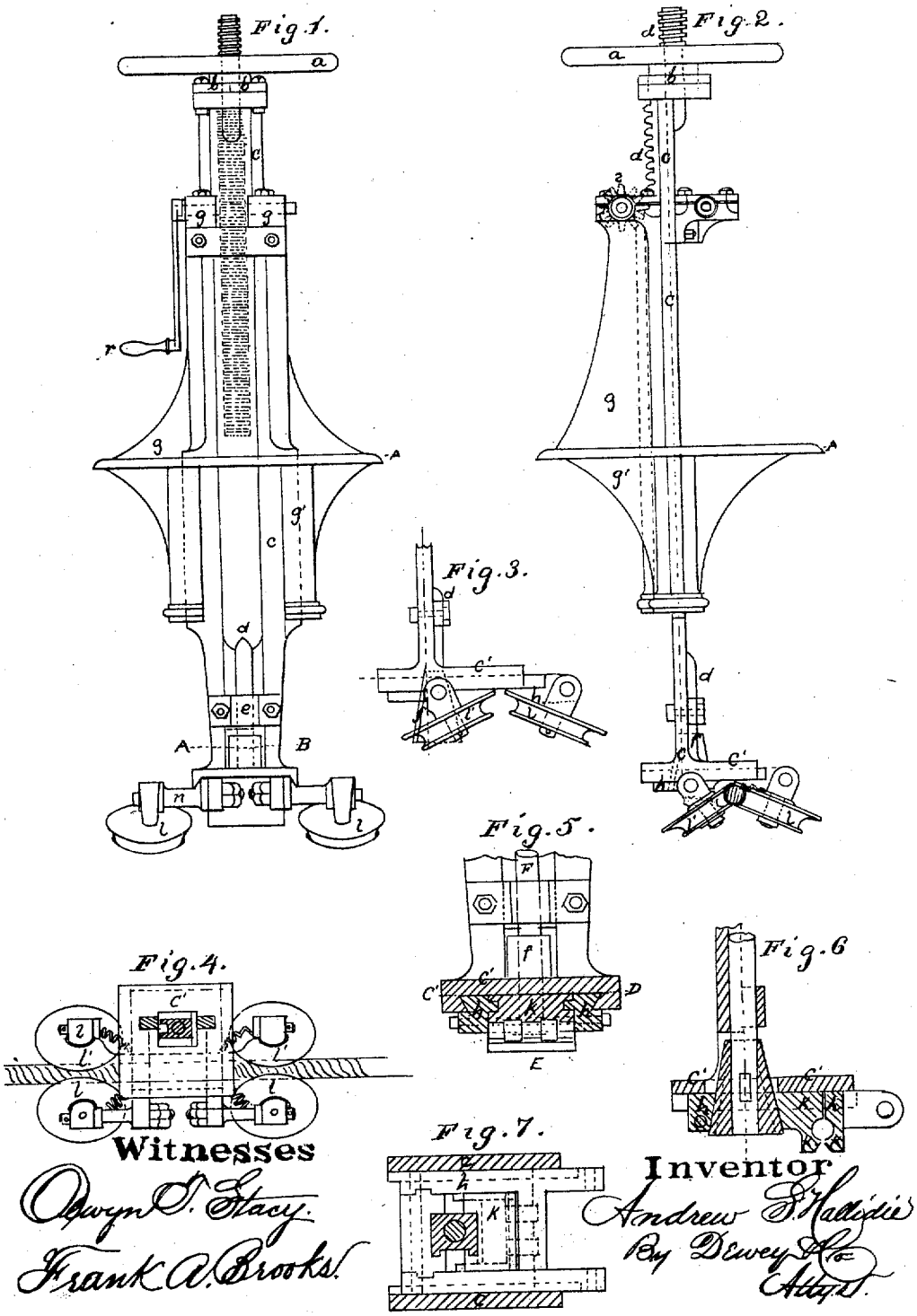
Witnesses
Oswyn T. Stacy.
Frank A. Brooks.
Inventor
Andrew S. Hallidie
By Dewey & Co
Attys.
THE NORRIS PETERS CO., PHOTO-LITHO., WASHINGTON, D. C.

UNITED STATES PATENT OFFICE.

ANDREW S. HALLIDIE, OF SAN FRANCISCO, CALIFORNIA.

IMPROVEMENT IN GRIPING ATTACHMENTS FOR ROPEWAYS.

Specification forming part of Letters Patent No. 129,130, dated July 16, 1872; Reissue No. 7,607, dated April 17, 1877; application field March 29, 1877.

*To all whom it may concern:*

Be it known that I, ANDREW S. HALLIDIE, of the city and county of San Francisco, and State of California, have invented an Improvement in Griping Attachments for Ropeways; and I do hereby declare the following to be a full, clear, and exact description thereof, reference being had to the accompanying drawings.

My invention relates to improvements in the propulsion of cars or other vehicles or vessels by means of an endless traveling rope, which is caused to move continuously beneath the car, and midway between the tracks, in an underground or submerged tunnel or tube, and with which the car, vehicle, or vessel is connected by means of a griping device, which extends down through a longitudinal slot in said tube.

The success of this system of propelling cars depends in a great measure upon the device or medium which is employed for connecting the car or other vehicle or vessel with the rope or traveling cable, and disconnecting it therefrom. This device I call the griper.

In the construction of this underground tube or tunnel, I mount the pulleys upon which the endless rope or cable is supported inside of the tube upon one side of the longitudinal slot, so that the rope or cable will be out of the way of any foreign matter or substance that may drop through the slot. This necessitates the construction of the griper with an L-shaped foot or griping power on the side of the standard at its lower end, (being the portion which moves inside of the tube,) so that it will reach out to one side of the slot and gripe the rope. This L shape or side gripe also enables the griping-jaws to pass the rope-supporting pulleys conveniently, as will be more fully described hereinafter.

The griper used in this system of car propulsion must be so constructed that it can be made to release and pick up the rope or running cable at the will of the operator, thus involving a combination of movable gripers, a shank capable of vertical as well as a forward or horizontal movement in the slot, and of mechanism for raising and lowering the griper independently of the mechanism used for operating the griping-jaws, all as hereinafter more fully explained.

Referring to the accompanying drawings, Figure 1 is a front view of the attachment, showing the sliding bar for moving the wedge. Fig. 2 is a side view, showing more distinctly the rack and toothed wheel for raising and lowering the gripe. Fig. 3 shows the guide-pulleys separated. Fig. 4 is a top view, showing the arrangement of the guide-pulleys. Figs. 5, 6, and 7 are detail views of the griping attachment.

The frame in which the griping device is held and operated consists of a plate or flange, A, which is to be strongly secured to the floor or deck of the vehicle or vessel to be propelled, and which has a standard, *g*, extending upward to the desired height.

On the under side of the plate A is a pendant or extension of the standard *g'*, which passes down through, and extends a sufficient distance below, the floor or deck of the vessel to support the sliding shank *c*, which passes vertically through it.

This shank or slide is a thin plate of metal, of any desired width, which is arranged to be moved up or down through the standard *g* and extension *g'* by means of a pinion or toothed roller, S, which is mounted in boxes on the top of the standard, and which engages with a rack, *d*, which is formed on the upper end of the slide or shank; or it may be raised and lowered by a screw and hand-wheel, if preferred.

The shank or slide is long enough to extend both below and above the standard *g* and pendant *g'*.

To the lower end of this sliding plate I attach the griping-jaws and pulleys, and operate them by means of a supplemental sliding bar from the upper end of the standard, as hereinafter described.

A block, *c'*, is secured to the lower end of the sliding stem *c*, the attachment being made near one end of the block, so that in connection with the stem it will form a side extension or L-shaped foot.

To the under side of this foot or block I mount two or more pairs of pulleys, *l l l' l'*, so that they can be moved toward or from each other, for the purpose of grasping and releasing the cable, as circumstances require. In the present instance the opposing pairs of pulleys are attached to two slides, *h h'*, which move in ways on the under side of the block *c'*.

A vertical sliding bar, *d*, is arranged to move in a groove or recess in the face of the stem *c*, for operating these frames in order to move the pulleys toward or from each other. The upper end of this bar extends above the stem *c*, where it is provided with screw-threads and a hand-wheel, *a*, which, being secured upon the upper end of the stem, serves to raise and lower the bar, as necessary. The lower end of this bar passes down through the block *c'*, and has secured at its lower extremity a wedge, *f*, which is broadest at its lower end.

This wedge moves between the sliding frames *h k*, so that when the wedge is lifted by turning the hand-wheel the jaws and pulleys are forced together upon the rope by the increasing size of the wedge, while the downward movement of the wedge separates the pulleys and allows the rope to drop. Flanges at the corners of the wedge, moving in corresponding recesses in the frames, serve to connect the movement of the frames with the movement of the wedge.

The pulleys, as will be noticed in Figs. 1, 2, and 3, are mounted upon journals, so that they stand at an angle to each other, their under faces forming two inclined sides, which converge toward their upper edges, between which the rope or cable is seized. This construction of the pulleys enables me to drop the cable by separating the pulleys sufficiently, and to pick it up again, when desired, by lowering the foot or block *c'* until the pulleys drop over the rope sufficiently to allow them to be closed upon it. When the rope has been caught it can be lifted to the proper position by means of the rack and pinion at the upper end of the standard *g*.

This feature is of the utmost importance in the construction of a griper for this class of work, because it oftens happens that a car must stand in a fixed position on the track for a considerable time; in which case, if the pulleys continued holding the cable, the speed at which the cable is traveling would soon heat and destroy them, and injure the rope; but, by providing the combination of devices above described, I entirely overcome this difficulty by enabling the attendant or operator to release the cable entirely from the gripers, when desired, and, with equal facility, to pick it up again when the car is ready to proceed.

In order to provide a convenient and desirable amount of elasticity, so that the pulleys shall act as "feelers" in picking up the rope, and to avoid accident by a too sudden and powerful compressing of the pulleys upon the rope or cable, I employ spiral or other springs (shown at Fig. 4) for retaining the pulleys in an angular position, so that the compression of the pulleys upon the rope will compress the springs and render their pressure elastic. These pulleys therefore serve to pick up and gripe the rope when it is desired to move the car, but in order to give a positive griping-power, such as will be absolutely necessary where the car is to be drawn or propelled up a steep grade, I provide a positive or fixed jaw, *h*, on one of the sliding frames *k*, and another, *h'*, on the other frame *k'*, so that when the pulleys have been compressed tightly on the rope the positive jaws will be brought into action, so as to gripe it more powerfully, thus insuring a holding-power upon the rope that will be sufficient in all cases.

I prefer to place the positive jaws between the pulleys, as they will thus be in the most favorable position for seizing the rope when the pulleys are forced together.

It will also be evident that when the car is to be stopped for only a moment, such as to drop a passenger, or the like, I can, by lowering the wedge a short distance, slightly separate the frames, so as to release the positive or fixed jaws from the rope without dropping it from the pulleys, in which case the rope will move between the pulleys at its ordinary speed, ready to be griped at any moment, and in starting up again, if the springs are sufficiently strong, their gripe upon the rope will give the car a forward motion before the fixed griper seizes it, thus relieving the car of the jar consequent upon suddenly starting it from a state of rest.

I thus combine, by a simple arrangement, all the features necessary to the practical and positive working of the griper.

In actual operation the foot or L-shaped lower end of the griper will move inside of the tube while the thin shank *c* moves in the slot and connects the foot with the operating mechanism above, so that the entire mechanism can be operated from the deck of the car or vessel.

Having thus described my invention, what I claim, and desire to secure by Letters Patent, is—

1. A griping device for connecting cars and other vehicles with an endless moving rope, consisting of griping jaws or pulleys attached to the lower end of a vertical shank, *c*, said jaws or pulleys being operated by means of suitable mechanism, substantially as above described.

2. A griping device for connecting cars and other vehicles with an endless moving rope, provided with pulleys *l' l'*, mounted at an angle to each other for the purpose of dropping and picking up the cable at pleasure, substantially as above described.

3. In a device for griping an endless moving rope, and connecting said rope with a car or other vehicle, the pulleys *l l'*, for holding the rope when the car stops its motion temporarily, in order to obviate the complete dropping of the rope, substantially as above specified.

4. The adjustable sliding stem or plate *c*, with its L-shaped foot or block, substantially as and for the purpose above described.

5. The spring-pulleys *l l l' l'*, when attached to the oppositely-operating slides *h* and *k*, for the purpose specified.

6. The jaws *h'* and *k'*, and pulleys *l l l' l'*, when secured to the oppositely-moving slides *h* and *k*, for the purpose specified.

7. The jaws *h'* and *k'*, when secured to the oppositely-moving slides *h* and *k*, for the purpose specified.

8. The sliding bar *d*, operated by the hand-wheel *a*, and having the wedge *f* secured at its lower end, in combination with the oppositely-moving slides *h* and *k*, substantially as and for the purpose above described.

9. Operating griping-jaws *h' k'*, and guide-pulleys *l l l' l'*, or either of them, from the deck of the vessel or floor of the vehicle, by means of the sliding rod *d* and wedge *f*, substantially as described, and for the purpose specified.

In witness whereof I have hereunto set my hand and seal.

A. S. HALLIDIE.

Witnesses:
FRANK A. BROOKS.
O. T. STACY.